United States Patent
Xia et al.

(10) Patent No.: US 9,844,809 B2
(45) Date of Patent: Dec. 19, 2017

(54) FORMING TOOLS HAVING TEXTURED SURFACES

(71) Applicant: FORD GLOBAL TECHNOLOGIES, LLC, Dearborn, MI (US)

(72) Inventors: Zhiyong Cedric Xia, Canton, MI (US); Jian Cao, Wilmette, IL (US); Qian Wang, Mt. Prospect, IL (US); Rajesh Talwar, St. Louis, MO (US); Donald J. Grzina, St. Louis, MO (US); Tiffany Davis Ling, Plymouth, MI (US); Pinzhi Liu, Dunlap, IL (US)

(73) Assignees: FORD GLOBAL TECHNOLOGIES, LLC, Dearborn, MI (US); THE BOEING COMPANY, Chicago, IL (US); NORTHWESTERN UNIVERSITY, Evanston, IL (US)

( * ) Notice: Subject to any disclaimer, the term of this patent is extended or adjusted under 35 U.S.C. 154(b) by 3 days.

(21) Appl. No.: 15/077,056

(22) Filed: Mar. 22, 2016

(65) Prior Publication Data
US 2016/0199899 A1    Jul. 14, 2016

Related U.S. Application Data

(62) Division of application No. 13/465,587, filed on May 7, 2012, now Pat. No. 9,321,090.

(51) Int. Cl.
*B21D 22/02*    (2006.01)
*B21D 24/04*    (2006.01)
(Continued)

(52) U.S. Cl.
CPC ............. *B21D 22/02* (2013.01); *B21D 22/00* (2013.01); *B21D 22/20* (2013.01); *B21D 24/04* (2013.01);
(Continued)

(58) Field of Classification Search
CPC ........ B21D 22/00; B21D 22/20; B21D 22/02; B21D 22/26; B21D 22/04; B21D 26/021;
(Continued)

(56) References Cited

U.S. PATENT DOCUMENTS

| | | | | |
|---|---|---|---|---|
| 4,087,898 A | * | 5/1978 | Linne | B21B 1/163 |
| | | | | 29/527.5 |
| 5,901,599 A | * | 5/1999 | Sato | B21D 22/22 |
| | | | | 72/350 |

(Continued)

FOREIGN PATENT DOCUMENTS

| | | |
|---|---|---|
| CN | 101318261 A | 12/2008 |
| KR | 20050067976 | 7/2005 |
| KR | 20110054605 | 5/2011 |

OTHER PUBLICATIONS

Haiwu Yu, et al., Geometric Shape Effects of Surface Texture on the Generation of Hydrodynamic Pressure Between Conformal Contacting Surfaces, Published Online Aug. 12, 2009, ©Springer Science-FBusiness Media, LLC 2009.
(Continued)

*Primary Examiner* — R. K. Arundale
*Assistant Examiner* — Mohammad Yusuf
(74) *Attorney, Agent, or Firm* — Marla Johnston; MacMillan, Sobanski & Todd, LLC

(57) ABSTRACT

A forming tool stamps sheet metal blanks into a desired shape. A contoured surface is defined for the forming tool so that respective portions of the metal blank flow over the contoured surface during forming. An intrinsic material flow pattern resulting from the contoured surface is compared to a desired flow in order to identify regions of the contoured surface having an insufficient flow that creates areas in the formed metal blank receiving less than a desired amount of metal. A surface microtexture is applied onto the contoured surface in a pattern selected to increase metal flow along the (Continued)

identified regions by providing a coefficient of friction in the identified regions that is reduced relative to adjacent regions of the contoured surface.

5 Claims, 4 Drawing Sheets

(51) Int. Cl.
*B21D 22/20* (2006.01)
*B21D 22/00* (2006.01)
*G06F 17/50* (2006.01)

(52) U.S. Cl.
CPC .......... *G06F 17/5009* (2013.01); *G06F 17/50* (2013.01); *G06F 17/5018* (2013.01); *G06F 17/5086* (2013.01); *G06F 2217/42* (2013.01)

(58) Field of Classification Search
CPC ............... B21D 26/031; G06F 17/5086; G06F 17/5009; G06F 17/50; G06F 2217/12; G06F 2217/16; G06F 2217/42; G06F 17/5018
See application file for complete search history.

(56) References Cited

U.S. PATENT DOCUMENTS

| | | | |
|---|---|---|---|
| 6,353,768 | B1 | 3/2002 | Karafillis et al. |
| 6,745,609 | B2 | 6/2004 | Garnett et al. |
| 7,130,708 | B2 | 10/2006 | Wang et al. |
| 2004/0083786 | A1 | 5/2004 | Garnett et al. |
| 2006/0201229 | A1 | 9/2006 | Zhu et al. |
| 2010/0083728 | A1 | 4/2010 | Morales |
| 2010/0307215 | A1* | 12/2010 | Morales ............... B21D 26/021 72/342.7 |
| 2014/0130564 | A1* | 5/2014 | Suzuki ....................... B21J 1/06 72/342.5 |

OTHER PUBLICATIONS

Davis, T., et al., 2008 Experimental Friction Study of Micro-Scale Laser-Textured Surfaces, International Workshops on Microfactories 2008, Evanston, IL.

Wakuda, M., et a;., 2003, Effect of Surface Texturing on Friction Reduction Between Ceramic and Steel Materials under Lubricated Sliding Contact, Wear 254 356-363.

Geiger, M., et al., 2002, Excimer Laser Micro Texturing of Cold Forging Tool Surfaces—Influences on Tool Life, Cirp Annals-Manufacturing Technology, 51 231-234.

Krux, R., et al., 2005, Die Surface Structures and Hydrostatic Pressure System for the Material Flow Control in High-Pressure Sheet Metal Forming Advanced Materials Research 6-8 385-392.

Yuanjie Wu, M.S., "Study of Interface Friction Reduction Using Laser Micro-Textured Die Surfaces in Metal Forming", Dissertion, Presented in partial Fulfillment of the Requirements for The Degree of Doctor of Philosophy in the Graduate, School of The Ohio State University, 2008.

Fanming Meng, et al., "Study on Effect of Dimples on Frictionof Parallel Surfaces Under Different Sliding Conditions", Applied Surface Science 256 (2010) pp. 2863-2875, Available online Dec. 23, 2009.

Dumitru, Gabriel, "Laser-assisted Generation of Tribological Surfaces" Inspire / ETH Zurich, www.swisslaser.net/libraries,files/Dumitru SSOM 2009.pdf, 2009.

Hua Xi-Jun, et al., Study on Sheet Material Flow Performance on the Surface of Laser Micro Composite Texture Die, Lubrication Engineering, vol. 33, No. 12, pp. 5-10, Dec. 2008.

\* cited by examiner

US 9,844,809 B2

FORMING TOOLS HAVING TEXTURED SURFACES

CROSS REFERENCE TO RELATED APPLICATIONS

This application is a division of co-pending U.S. application Ser. No. 13/465,587, filed May 7, 2012, which is hereby incorporated by reference.

STATEMENT REGARDING FEDERALLY SPONSORED RESEARCH

Not Applicable.

BACKGROUND OF THE INVENTION

The present invention relates in general to metal-forming, and, more specifically, to improved forming tools such as drawing/stamping dies with the ability to manipulate metal flow patterns during drawing.

Sheet metal forming is used in many industries, including in the manufacture of automotive body panels and structural components. One commonly used process uses stamping dies having a punch side and a cavity side with matching surface contours. During stamping, metal is drawn into a desired shape as defined by the contoured surfaces. The material of the sheet metal flows over the die surfaces as it bends and stretches under the forces applied by the drawing together of the die surfaces.

Significant engineering effort is necessary to design a metal-forming manufacturing process. A designer determines the die surface contours, the locations and strength of binding elements, and the size and shape of the metal blank, for example. When the desired shape of a manufactured component has steep or complex bends, it may be difficult to design dies that avoid the tendency for the metal to flow too much in one direction and not enough in another direction. Without proper flow, some regions may not achieve a desired thickness during drawing. In particular, an area of the finished (i.e., stamped) component may be too thin because of a net flow away from that area.

Friction between the die surfaces and the flowing metal sheet results in wear of the die surfaces. The dies have a limited tool life as a result of wear. Thus, it would be desirable to reduce friction between the tools and the workpiece in order to enhance tool life.

SUMMARY OF THE INVENTION

In one aspect of the invention, a method is provided for manufacturing metal-formed components having a desired shape. A contoured surface is defined for a forming tool for forming a metal blank into the desired shape, wherein respective portions of the metal blank flow over the contoured surface during forming. An intrinsic material flow pattern resulting from the contoured surface is compared to a desired flow in order to identify regions of the contoured surface having an improper flow that creates areas in the formed metal blank receiving more or less than a desired amount of metal. A surface microtexture is applied onto the contoured surface in a pattern selected to alter the metal flow along the identified regions by providing a friction in the identified regions that is altered relative to adjacent regions of the contoured surface. Preferably, the surface microtexture is configured to reduce friction and increase the metal flow within at least some identified regions, but may also be configured to increase friction in order to reduce the metal flow from an identified region when desired.

DETAILED DESCRIPTION OF PREFERRED EMBODIMENTS

Figure 1:
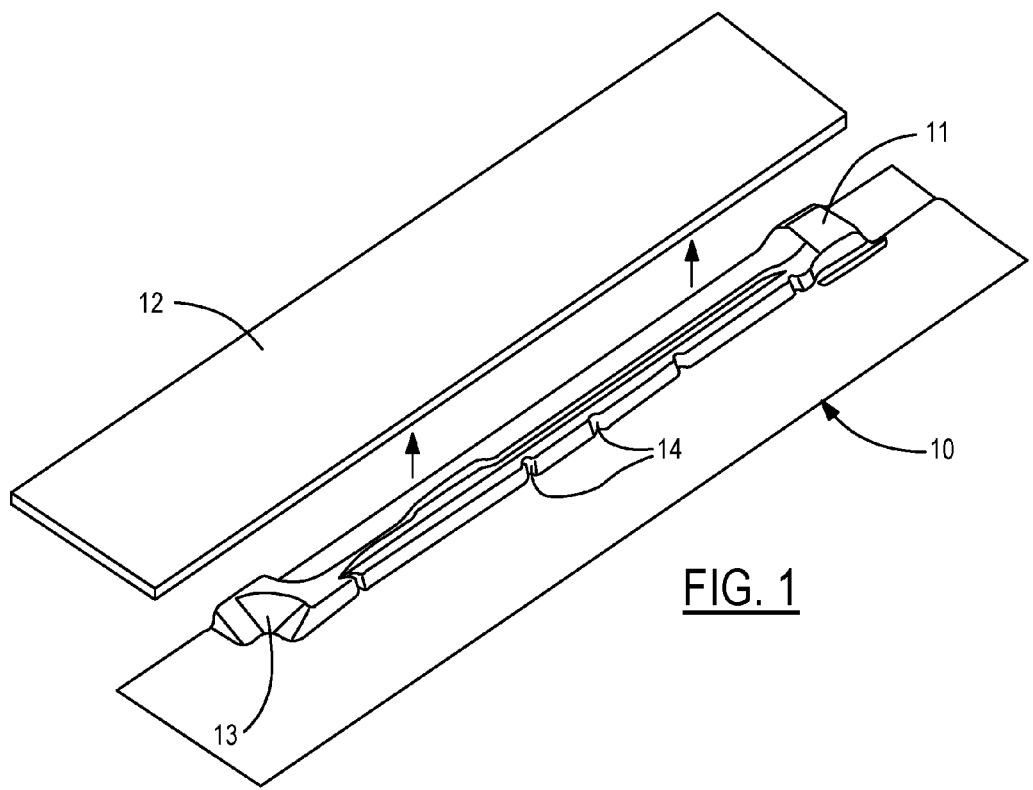
FIG. 1 is a perspective view of a stamping die and a metal blank.

Referring now to FIG. 1, a die 10 for a forming tool has a contoured surface 11 that is stamped against a sheet metal blank 12 to form a desired shape. Contoured surface 11 includes a feature 13 with a complex curvature and a feature 14 with sharp bends. An intrinsic material flow pattern resulting from the contoured surface 11 may result in regions of insufficient flow, thereby creating areas in the formed metal blank that receive less than a desired amount of metal material.

Figure 2:
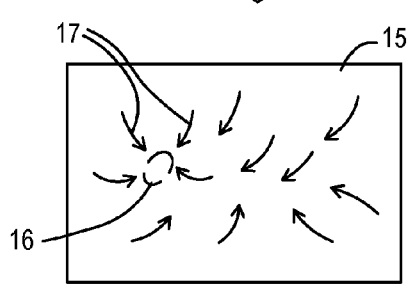
FIG. 2 is a diagram of a desired metal flow pattern mapped onto a die surface.

FIG. 2 shows a desired metal flow pattern mapped onto a contoured die surface 15. Surface 15 is contoured in three dimensions, but is shown for simplicity projected onto a two-dimensional surface in FIGS. 2-7. An area 16 may correspond to a significant bend in the finished component, whereby the desired flow 17 specifically includes a flow component directed toward region 16.

Figure 3:
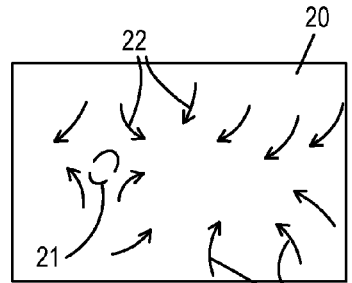
FIG. 3 is an actual metal flow pattern corresponding to an intrinsic flow pattern corresponding to a particular die surface design.
Figure 4:
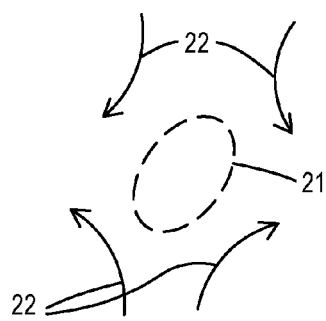
FIG. 4 shows an area of undesirable metal flow in greater detail.

Any particular configuration of the contoured surfaces for the dies produces an intrinsic (i.e., unmodified) flow pattern as shown in FIG. 3. The direction and magnitude of actual material flow depends upon forces acting on the metal blank, which includes surface friction as the metal slides over the die surfaces. During development of the particular manufacturing process and die set, engineers use computer simulations to analyze and refine a design. The simulations sequentially analyze the deformation forces acting on the sheet metal in discrete steps as the die surfaces move together. The analysis of forces includes calculations of the sliding friction between the flowing metal sheet and the die surfaces. The calculations depend on a coefficient of friction (i.e., flow resistance) that characterizes the particular materials and their surface finishes. In conventional simulations, the coefficient of friction has been assumed to be constant across all the interacting surfaces and assumed to be independent of the direction of flow. Since smooth surface finishes and/or coatings have been used in an attempt to reduce the coefficient of friction, the assumption that the coefficient of friction is non-directional was reasonably accurate. In some embodiments of the invention as described below, a coefficient of flow direction that varies according to the direction of flow may be introduced. Moreover, conventional aluminum sheet metal blanks commonly have a surface texture that results in some directionality of the flow resistance which has not been accounted for. In the present invention, any sheet metal texture affecting the flow resistance (either increasing it or decreasing it) can be employed as one factor for influencing the metal flow pattern.

In FIG. 3, an intrinsic material flow pattern for a contoured die surface 20 results in an area 21 receiving insufficient flow. The flow is shown as vectors 22 corresponding to the net flow passing across each respective point on die surface 20. As shown in greater detail in FIG. 4, insufficient-flow area 21 is surrounded by flow portions 22 that could supply area 21 with the necessary material if it could be redirected. Besides being areas of low or no flow during stamping, portions 22 could also be areas carrying an over-abundance of material to an undesired destination.

The present invention provides a mechanism for controlling material flow. Specifically, variations in the coefficient of friction are introduced across the die surfaces in order to modify the material flow to counteract deficiencies in the intrinsic flow pattern. As a result of relative differences in friction across the surface, it is possible to influence the flow of the metal. The relative differences can be introduced by surface treatment that either locally reduces or locally increases friction. The invention will be primarily described in connection with reducing friction since surface wear is improved by reducing friction, but the invention can included relative friction increases in certain areas to counteract or help redirect areas with excess flow.

Figure 5:
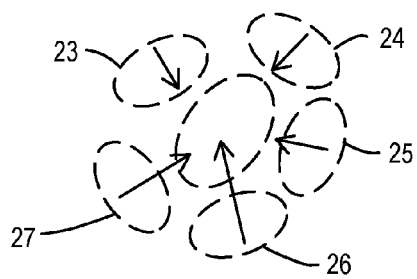
FIG. 5 shows regions mapped onto the die surface having reduced surface friction to modify the metal flow pattern.

As shown in FIG. 5, area 21 receiving insufficient material is surrounded by regions 23-27 of locally-reduced flow resistance, thereby increasing flow in the directions shown by the arrows in order to supply the metal material for area 21. The increased flows shown in FIG. 5 are achieved by adding surface microtexture as has been used to reduce friction and wear in various cutting tool applications. For example, laser etching has been employed to create microscopic dimples on a tool surface that decrease surface friction by creating lubricant pockets and by providing receptacles for receiving wear particles in order to prevent surface damage via plowing. The decrease in the coefficient of friction across the die surface can be made to be omni-directional at each point but with relative differences between particular regions, so that the change in flow merely results from the material following a path of least resistance. As further explained below, the reduced coefficient of flow resistance can also be made to be dependent upon the flow direction to even more effectively modify a flow pattern.

Figure 6:
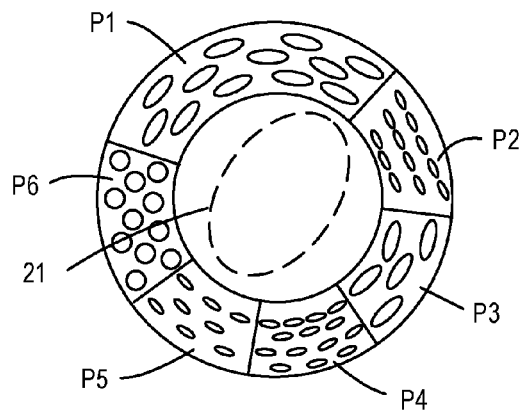
FIG. 6 illustrates various surface microtextures for reducing surface friction in respective regions relative to adjacent regions.
Figure 7:
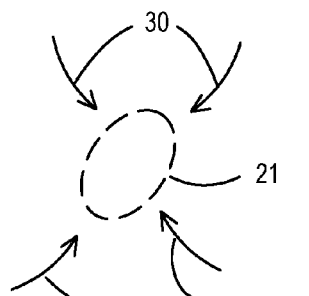
FIG. 7 illustrates a corrected metal flow pattern resulting from the application of microtexture onto the die surface.

FIG. 6 shows various patterns of micro-elements that can be applied to the contoured die surface when reducing friction. In a preferred embodiment, the micro-elements are comprised of oval or elliptical dimples formed as raised features above the main plane of the die surface, wherein each dimple is in the range of about 5-10 µm in length and about 3 µm in height (or equivalently in depth if formed as negative dimples). The relative reduction in the coefficient of flow resistance obtained when using a microtexture can be controlled by changing dimple size and/or packing density in any particular region, for example. Thus, a pattern P1 may provide a smaller resistance reduction than a pattern P2 by virtue of a different dimple size and density. The major axis of the oval dimples may be aligned along lines of arc as shown in pattern P1, may be arranged in straight lines as shown in pattern P2, or may be organized in other patterns or randomly. In the event that it is desired to increase friction is a particular region, a well-polished flat surface can be created or microtextures can be applied that demote lubrication film and increase surface interaction.

Variations in resistance between different regions may also be obtained using dimples of equal size at different densities or spacings as shown by patterns P4 and P5. Instead of ovals, the dimples can also be circular as shown in pattern P6 or in other shapes such as rectangles.

Based on a comparison between the intrinsic material flow pattern and a desired flow pattern, the present invention identifies regions having insufficient flow and the relative decrease in flow resistance necessary to achieve the desired flow. A suitable pattern of the surface microtexture is determined, and after being applied to the contoured surface of the die results in a modified material flow pattern 30 shown in FIG. 7 that increases metal flow into area 21.

Figure 8:
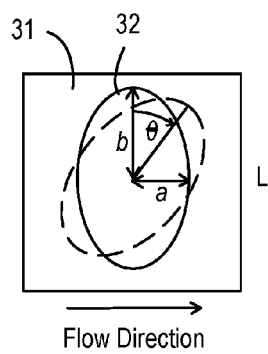
FIG. 8 shows one preferred shape of a micro-element feature as an oval or ellipse.
Figure 9:
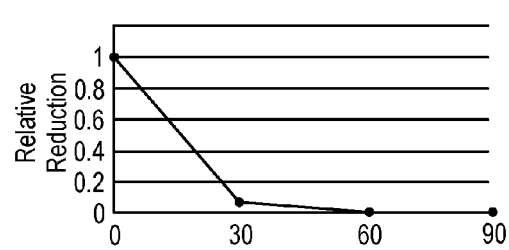
FIG. 9 is a graph showing the directionality of the friction reduction across the micro-element of FIG. 8.

Oval micro-elements are a preferred microtexture shape because of their ability to create a directional bias to the flow because the reduction in the coefficient of flow resistance is dependent upon material flow direction with respect to the axis of the oval. As shown in FIG. 8, a die surface 31 has an oval dimple 32 with a semi-minor axis a and a semi-major axis b. The solid line for dimple 32 represents an orientation in which an angle θ between the semi-major axis and a vertical axis is equal to zero. FIG. 9 plots the relative reduction in flow resistance for increasing values of θ up to 90° (the metal flow direction being horizontal in FIG. 8). The relative reduction in flow resistance is highest with θ equal to zero (i.e., with flow being perpendicular to the major axis, or parallel with the minor axis). The relative reduction drops to a minimum as flow becomes more parallel with the major axis (i.e., along the narrowest profile of dimple 32).

Figure 10:
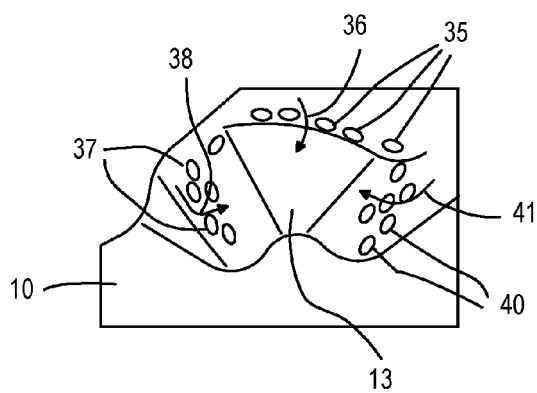
FIGS. 10 and 11 depict the locations and orientations of microtexture added to respective portions of the stamping die of FIG. 1.
Figure 11:
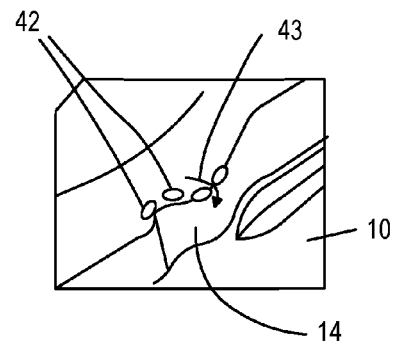

By introducing directionality to the reduction in the coefficient of flow resistance, the effect upon the modified flow direction is enhanced. As shown in FIG. 10, a die 10 has an applied microtexture around complex-curved feature 13 with oval dimples aligned peripherally around area 13 in a manner to increase metal flowing into area 13. More specifically, dimples 35 are aligned along a top edge of area 13 to enhance a metal flow along a flow direction 36, and microtexture dimples 37 and 40 are applied along the sides of area 13, respectively, to provide enhanced flows 38 and 41 from the sides. Similarly, flow 43 over a sharp bend along feature 14 shown in FIG. 11 is enhanced by microtexture dimples 42. It should be noted that the dimples in FIGS. 10 and 11 are greatly exaggerated in size for clarity (i.e., each oval represents a multiplicity of smaller ovals).

Figure 12:
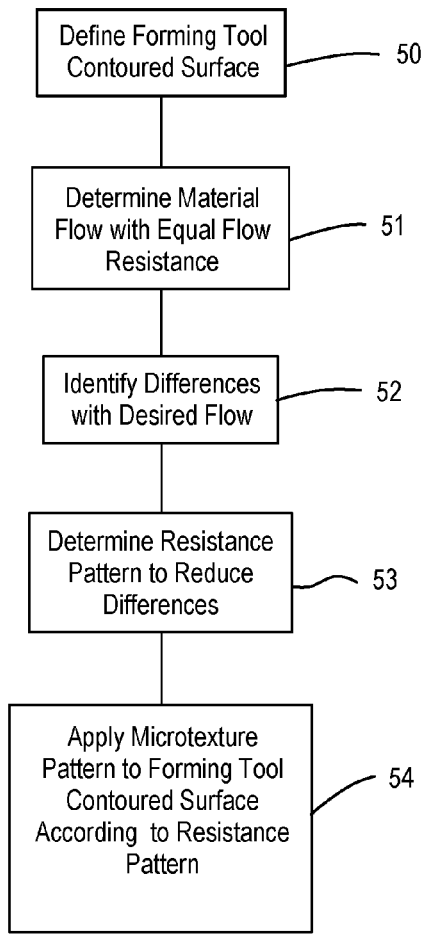
FIG. 12 is a flowchart showing one preferred method of the invention.

FIG. 12 illustrates a preferred method of the invention wherein a contoured surface is defined for a forming tool in step 50. Various types of forming tools are included in the present invention, such as stamping dies, extrusion dies, or any other tools in which metal flows over a die surface during forming. In step 51, an intrinsic material flow is determined based upon an assumption of having an equal flow resistance along all points of the surface on the forming tool. The intrinsic flow pattern may be determined by an appropriate computer model or by actually manufacturing a component using the defined tool surface. In step 52, differences between the intrinsic material flow and a desired material flow are identified. A graduated resistance pattern (which may have regions to possess a decreased friction and/or regions to possess an increased friction) that will reduce the differences between the material flows is determined in step 53. In step 54, the appropriate microtexture pattern is applied to the forming tool contoured surface according to the resistance pattern determined in step 53.

Figure 13:
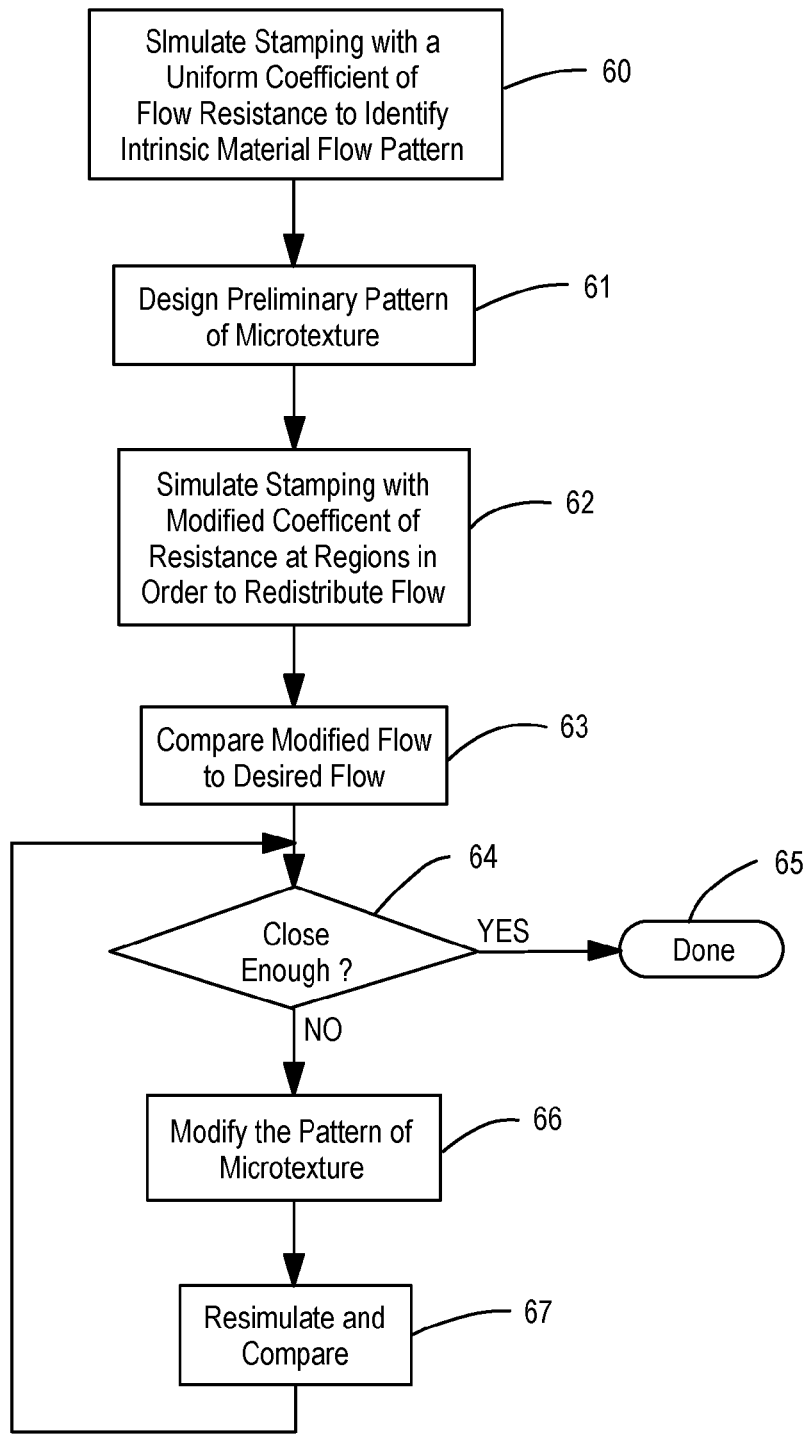
FIG. 13 is a flowchart showing in greater detail a preferred embodiment of a portion of the method of FIG. 12.

In one preferred method, steps 52 and 53 of FIG. 12 may be performed using computer simulations as shown in FIG. 13. In step 60, a stamping is simulated with a uniform coefficient of flow resistance in order to identify the intrinsic material flow pattern. A preliminary pattern of microtexture is designed in step 61 based on an inspection of the intrinsic material flow pattern, whereby the microtexture pattern corresponds to regions of reduced flow resistance between areas receiving excess flow and areas receiving insufficient flow (and/or regions of increased resistance to block flow toward an area receiving excess flow).

In step 62, a second computer simulation is performed of the stamping using a modified coefficient of resistance at the identified regions according to the preliminary pattern in order to simulate a redistribution of the metal flow to more closely achieve the desired flow. The modified flow is compared with the desired flow in step 63 and a check is made in step 64 to determine whether the modified flow is sufficiently close to the desired flow. If yes, then the computer simulation is done at step 65 and then the microtexture pattern is applied to the forming tool. If the modified flow is not yet sufficiently close to the desired flow, then the differences between the modified flow and the desired flow are used to identify modifications to be made in the microtexture pattern in step 66. Using the remodified microtexture pattern, the material flow is resimulated and then recompared to the desired flow in step 67, before returning to step 64 to determine whether the remodified flow is now close enough to the desired flow.

Figure 14:
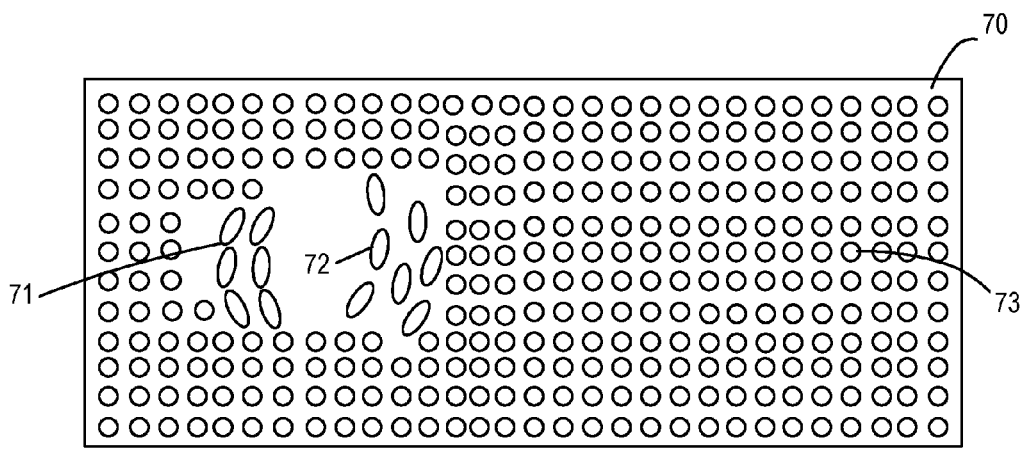
FIG. 14 depicts the application of microtexture to an entire die surface to reduce tool wear.

The present invention may utilize microtexture only in the regions necessary to redistribute the metal flow to achieve the desired final part thickness in all regions of the part. However, only relative changes in the coefficient of flow resistance are necessary in order to obtain the desired control over the material flow. Thus, it is also possible to reduce surface friction across all areas of the forming tool to improve overall tool life as shown in FIG. 14. Thus, a contoured surface 70 may include a general background pattern of microtexture 73 which enhances lubrication performance and reduces friction generally across surface 70. The flow resistance properties using background microtexture pattern 73 provide an intrinsic material flow pattern that can be used to identify regions of the contoured surface 70 with insufficient flow. The relative flow resistance in the identified regions is addressed using specific patterns of surface microtexture 71 and 72 that provide an even greater reduction in the coefficient of flow resistance. The further reduction in resistance may also include a directional component to the flow resistance. In particular, the pattern of surface microtexture is thus graduated so that friction is reduced by the greatest extent within the identified regions.

What is claimed is:

1. A forming tool for shaping a metal blank into a desired shape, comprising:
a contoured die surface for pressing against the metal blank so that respective portions of the metal blank flow over the contoured surface during deformation of the metal blank into the desired shape for a stamped component;
wherein the contoured die surface corresponds to an intrinsic material flow pattern based on a uniform coefficient of resistance across the contoured die surface that would cause unequal stretching of the metal blank, so that an insufficient flow in the predetermined regions would create areas in the shaped metal blank receiving less than a desired amount of metal;
wherein the contoured surface carries a surface texture in a pattern that increases metal flow along the predetermined regions, whereby a reduced coefficient of friction is provided in the predetermined regions relative to a coefficient of friction of the contoured surface adjacent to the predetermined regions;
wherein the pattern of the surface texture is comprised of repeated elliptical dimples;
wherein at least some of the elliptical dimples have an aspect ratio not equal to one and have a major axis and a minor axis;
wherein the flow encounters a lowest flow resistance along the minor axis; and
wherein the at least some of the elliptical dimples have their respective minor axis aligned with respective desired flow directions in the predetermined regions.

2. The forming tool of claim 1 wherein the surface includes a general background of texture to cover substantially all of the contoured surface, and wherein the pattern of surface texture is graduated so that friction is reduced by the greatest extent within the predetermined regions and is reduced generally across the surface to provide wear reduction.

3. The forming tool of claim 1 wherein the contoured die surface is formed on a drawing die adapted to receive the metal blank in the form of sheet metal.

4. The forming tool of claim 1 wherein the elliptical dimples are comprised of laser etched dimples formed as raised features above the contoured surface, and wherein each of the elliptical dimples is in a range of about 5-10 μm in length and about 3 μm in height.

5. A forming tool for shaping a metal blank into a desired shape, comprising:
a contoured die surface for pressing against the metal blank so that respective portions of the metal blank flow over the contoured surface during deformation of the metal blank into the desired shape;
wherein the contoured die surface corresponds to an intrinsic material flow pattern based on a uniform coefficient of resistance across the contoured die surface that would cause unequal stretching of the metal blank, so that an insufficient flow in the predetermined regions would create areas in the shaped metal blank receiving less than a desired amount of metal; and
wherein the contoured surface carries a surface texture in a pattern that increases metal flow along the predetermined regions, whereby a reduced coefficient of friction is provided in the predetermined regions relative to a coefficient of friction of the contoured surface adjacent to the predetermined regions;
wherein the surface texture is comprised of laser etched dimples, wherein the dimples are formed as raised features above the contoured surface, and wherein each dimple is in a range of about 5-10 μm in length and about 3 μm in height;

wherein the laser etched dimples are comprised of elliptical dimples having an aspect ratio not equal to one and having a major axis and a minor axis;

wherein the metal flow encounters a lowest flow resistance along the minor axis; and wherein the elliptical dimples have their respective minor axis aligned with respective desired flow directions in the predetermined regions.

\* \* \* \* \*